United States Patent
Nagai et al.

(10) Patent No.: US 11,254,806 B2
(45) Date of Patent: Feb. 22, 2022

(54) RUBBER COMPOSITION FOR VIBRATIONPROOF RUBBER AND VIBRATIONPROOF RUBBER

(71) Applicant: Toyo Tire Corporation, Itami (JP)

(72) Inventors: Hama Nagai, Itami (JP); Hiroyasu Funahashi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 153 days.

(21) Appl. No.: 16/695,996

(22) Filed: Nov. 26, 2019

(65) Prior Publication Data

US 2020/0165420 A1 May 28, 2020

(30) Foreign Application Priority Data

Nov. 27, 2018 (JP) .............................. JP2018-221188
Nov. 27, 2018 (JP) .............................. JP2018-221298

(51) Int. Cl.
| | |
|---|---|
| *C08L 9/06* | (2006.01) |
| *C08K 3/04* | (2006.01) |
| *C08K 3/36* | (2006.01) |
| *F16F 1/36* | (2006.01) |
| *F16F 15/08* | (2006.01) |
| *B60K 5/12* | (2006.01) |

(52) U.S. Cl.
CPC .................. *C08L 9/06* (2013.01); *C08K 3/04* (2013.01); *C08K 3/36* (2013.01); *F16F 1/3605* (2013.01); *B60K 5/1208* (2013.01); *F16F 15/08* (2013.01); *F16F 2224/025* (2013.01); *F16F 2226/04* (2013.01)

(58) Field of Classification Search
CPC ..... C08L 9/06; C08K 3/04; C08K 3/36; F16F 1/3605; F16F 15/08; F16F 2224/025; F16F 2226/04; B60K 5/1208
USPC ......................................................... 524/526
See application file for complete search history.

(56) References Cited

U.S. PATENT DOCUMENTS

2016/0340446 A1* 11/2016 Takahashi ............ C07D 233/64

FOREIGN PATENT DOCUMENTS

| JP | 2000-336206 A | 12/2000 |
|---|---|---|
| JP | 2001-240702 A | 9/2001 |
| JP | 2007-9160 A | 1/2007 |

* cited by examiner

*Primary Examiner* — William K Cheung
(74) *Attorney, Agent, or Firm* — Westerman, Hattori, Daniels & Adrian, LLP

(57) ABSTRACT

A rubber composition for vibrationproof rubber is disclosed in which when a total amount of one or more rubber components is regarded as 100 parts by mass, a solution-polymerized styrene butadiene rubber is included in an amount of 85 to 100 parts by mass. This solution-polymerized styrene butadiene rubber is a rubber in which an amount-proportion of styrene is from 10 to 45% by mass, and an amount-proportion of vinyl is from 30 to 65% by mass. The solution-polymerized styrene butadiene rubber is preferably a modified solution-polymerized styrene butadiene rubber. When the total amount of rubber components is regarded as 100 parts by mass, the solution-polymerized styrene butadiene rubber is preferably included therein in an amount of 90 to 100 parts by mass. A carbon black is preferably included therein in an amount of 30 to 100 parts by mass for the same 100 parts by mass.

5 Claims, No Drawings

RUBBER COMPOSITION FOR VIBRATIONPROOF RUBBER AND VIBRATIONPROOF RUBBER

BACKGROUND OP THE INVENTION

Field of the Invention

The present invention relates to a rubber composition for vibrationproof rubber, particularly, a rubber composition for vibrationproof rubber and a vibrationproof rubber that are favorably usable for a vibrationproof member, such as an engine mount for an automobile.

Description of the Related Art

In vehicles such as automobiles, a vibrationproof rubber is used to absorb the vibration of their engine or vehicle body. This vibrationproof rubber is therefore requited to be high in attenuation.

Patent Document 1 listed below describes a technique of blending a specified amount of sulfur and a specified carbon black into 100 parts by mass of rubber components made mainly of 50 to 90 parts by mass of a natural rubber and 50 to 10 parts by mass of a styrene/butadiene rubber.

Patent Document 2 listed below describes a technique of blending a specified amount of sulfur and a specified carbon black into 100 parts by mass of rubber components made mainly of 50 to 85 parts by mass of a natural rubber and 50 to 15 parts by mass of a terminal modified styrene/butadiene rubber.

Apart from the above, in order to decrease pneumatic tires in rolling resistance. Patent Document 3 listed below describes a technique of using, as a raw material, the following rubber composition to produce a tread member: a rubber composition yielded by blending a specified amount of sulfur and a vulcanization promoter, and a specified carbon black into 100 parts by mass of a diene rubber component containing 40 parts or more by mass of a styrene/butadiene rubber.

PRIOR ART DOCUMENTS

Patent Documents

Patent Document 1: JP-A-2001-240702
Patent Document 2: JP-A-2000-336206
Patent Document: 3: JP-A-2007-9160

SUMMARY OP THE INVENTION

The inventors have made eager investigations about the above-mentioned precedent techniques to make it evident that in Patent Documents 1 and 2 listed above, there remains a room for a further improvement about a raise of the vibrationproof rubbers in attenuation. The technique described in Patent Document 3 listed above has been developed to decrease a pneumatic tire in rolling resistance, and this document neither describes nor suggests a raise of a vibrationproof rubber in attenuation, which is a problem peculiar to the vibrationproof rubber.

In the light of the above-mentioned actual situation, the present invention has been made. An object thereof is to provide a rubber composition for vibrationproof rubber that is a raw material for a vibrationproof rubber heightened in attenuation, and such a vibrationproof rubber.

The above-mentioned problems can be solved by an aspect of the present invention, which is as described in the following: The rubber composition for vibrationproof rubber according to the aspect of the present invention is a composition in which when the total amount of one or more rubber components is regarded as 100 parts by mass, a solution-polymerized styrene butadiene rubber is included in an amount of 85 to 100 parts by mass; and the solution-polymerized styrene butadiene rubber is a rubber in which an amount-proportion of styrene is from 10 to 45% by mass, and an amount-proportion of vinyl is from 30 to 65% by mass. In general, styrene butadiene rubbers are roughly classified into solution-polymerized styrene butadiene rubbers (hereinafter referred to also as S-SBRs) and emulsion-polymerized styrene butadiene rubbers (hereinafter referred to also as E-SBRs). The S-SBRs are narrower in molecular weight distribution (Mw/Mn) than the E-SBRs. The rubber composition for vibrationproof rubber according to the aspect of the invention contains a large amount-proportion of the S-SBR, in which the styrene amount-proportion and the vinyl amount-proportion are optimally designed; thus, a vibrationproof rubber produced using this rubber composition as raw material shows a high attenuation.

In the rubber composition for vibrationproof rubber, the solution-polymerized styrene butadiene rubber is preferably a modified solution-polymerized styrene butadiene rubber. As described above, the S-SBR is narrow in molecular weight distribution (Mw/Mn). Thus, when the rubber composition for vibrationproof rubber contains, particularly, a filler, the composition sufficiently exhibits a modification effect of the rubber. This effect contributes largely to an improvement of the filler in dispersibility. As a result, a vibrationproof rubber produced using this rubber composition as raw material shows a higher attenuation.

In the rubber composition for vibrationproof rubber, it is preferred that the solution-polymerized styrene butadiene rubber is included in an amount of 90 to 100 parts by mass when the total amount of the one or more rubber components is regarded as 100 parts by mass. In this case, the content of the solution-polymerized styrene butadiene rubber in the rubber composition for vibrationproof rubber is higher. This matter can attain a raise in the finally produced vibrationproof rubber in attenuation, and further can attain the compatibility of this raise with a decrease of the rubber in dynamic magnification ("dynamic spring constant"/"static spring constant" ratio). This dynamic magnification is an index related to internal vehicle noises. As the rubber composition is lower in dynamic magnification, the composition is better.

In the rubber composition for vibrationproof rubber, it is preferred that a carbon black is included in an amount of 30 to 100 parts by mass when the total amount of the one or more rubber components is regarded as 100 parts by mass since this case makes the hardness (static spring constant) of the resultant vulcanized rubber suitable for vibrationproof rubbers.

Moreover, the vibrationproof rubber according to an aspect of the present invention is obtained by vulcanizing and shaping the above-defined rubber composition for vibrationproof rubber.

The above-mentioned problems can also be solved by an aspect of the present invention, which is as described in the following: The rubber composition for vibrationproof rubber according to the aspect of the present invention is a composition in which when the total amount of one or more rubber components is regarded as 100 parts by mass, a solution-polymerized styrene butadiene rubber is included in an amount of 85 to 100 parts by mass, and a silica is included in an amount of 30 to 60 parts by mass; and the solution-polymerized styrene butadiene rubber is a rubber in which the amount-proportion of styrene is from 20 to 45% by mass, and the amount-proportion of vinyl is from 35 to 65% by mass. In general, styrene butadiene rubbers are roughly classified into solution-polymerized styrene butadiene rubbers (hereinafter referred to also as S-SBRs) and emulsion-polymerized styrene butadiene rubbers (hereinafter referred to also as E-SBRs). The S-SBRs are narrower in molecular weight distribution (Mw/Mn) than the E-SBRs. The rubber composition for vibrationproof rubber according to the aspect of the present invention contains a large amount-proportion of the S-SBR, in which the styrene amount-proportion and the vinyl amount-proportion are optimally designed, and additionally this rubber composition contains the predetermined amount silica; thus, a vibrationproof rubber produced using this rubber composition as raw material shows a high attenuation.

In the rubber composition for vibrationproof rubber, the solution-polymerized styrene butadiene rubber is preferably a modified solution-polymerized styrene butadiene rubber. As described above, the S-SBR is narrow in molecular weight distribution (Mw/Mn). Thus, when the rubber composition for vibrationproof rubber contains, particularly, a filler, the composition sufficiently exhibits a modification effect of the rubber. This effect contributes largely to an improvement of the silica in dispersibility. As a result, a vibrationproof rubber produced using this rubber composition as raw material shows a higher attenuation.

In the rubber composition of this aspect for vibrationproof rubber, a content of styrene in the solution-polymerized styrene butadiene rubber is preferably from 30 to 45% by mass. In this case, the hardness (static spring constant) of the resultant vulcanized rubber becomes suitable for vibrationproof rubbers. Additionally, this case can favorably make the vibrationproof rubber lower in dynamic magnification than the case of blending a carbon black as a filler into the rubber composition.

Moreover, the vibrationproof rubber according to an aspect of the present invention is obtained by vulcanizing and shaping the above-defined rubber composition for vibrationproof rubber.

DETAILED DESCRIPTION OF THE PREFERRED EMBODIMENTS

A description will be made about one of the aspects of the rubber composition for vibrationproof rubber according to the present invention. This rubber composition is a composition in which when the total amount of one or more rubber components is regarded as 100 parts by mass, an S-SBR is included in an amount of 85 to 100 parts by mass. This S-SBR is a rubber in which the amount-proportion of styrene is from 10 to 45% by mass, and the amount-proportion of vinyl is from 30 to 65% by mass.

The S-SBR is generally obtained by anion-polymerizing starting monomers in a hydrocarbon, and is characterized in that both of the molecular weight distribution thereof and the amount-proportion of vinyl therein are more easily controllable than any E-SER obtained by an emulsion polymerization method of the monomers (suspension polymerization method thereof) in water. The method for producing the S-SBR is not particularly limited as far as the method can attain the production of the S-SBR which is an S-SBR in which the amount-proportion of styrene is from 10 to 45% by mass, and the amount-proportion of vinyl is from 30 to 65% by mass. The method may be a method known by those skilled in the art. In order to heighten the finally obtained vibrationproof rubber in attenuation, the amount-proportion of styrene in the S-SBR is preferably from 20 to 45% by mass. Similarly, the amount-proportion of vinyl in the S-SBR is preferably from 50 to 65% by mass.

In the aspect of the present invention, the S-SBR is preferably a modified S-SBR. The modified S-SBR contains a functional group containing a heteroatom. This heteroatom-containing functional group may be introduced into a terminal of a polymer chain of an unmodified S-SBR, or may be introduced into the polymer chain. The functional group is preferably introduced into the terminal. Examples of the heteroatom-containing functional group include amino, alkoxyl, hydroxyl, epoxy, carboxyl and cyano groups, and halogen radicals. The modified solution-polymerized SBR may contain at least one of the functional groups given as the examples. Examples of the amino group include primary amino, secondary amino, and tertiary amino groups. Examples of the alkoxyl groups include methoxy, ethoxy, propoxy, and butoxy groups. Examples of the halogen radicals include chlorine, and bromine radicals. The functional groups given as the examples each interact with a filler, in particular, various functional groups that a carbon black has, and silanol groups (Si—OH) of silica. The word "interact" herein means following: in the case of, for example, a silica, the functional groups each react chemically with silanol groups of the silica to form chemical bonds or hydrogen bonds. The S-SBR may be an oil-extended product thereof that has a purpose of improving the carbon black or silica in fillability or workability.

The rubber composition for vibrationproof rubber according to the aspect of the present invention is a composition in which when the total amount of the rubber component(s) is regarded as 100 parts by mass, the S-SBR is included in an amount of 85 to 100 parts by mass. However, in order to attain the compatibility of a raise in attenuation with a lowering in dynamic magnification, the rubber composition contains the S-SBR in an amount that is from 90 to 100 parts by mass, more preferably from 95 to 100 parts by mass, in particular preferably 100 parts by mass when the total amount of the one or more rubber components is regarded as 100 parts by mass.

In the rubber composition for vibrationproof rubber according to the aspect of the present invention, the rubber component(s) blendable other than the S-SBR is/are, for example, natural rubber (NR). The rubber composition may contain, besides natural rubber, a synthetic rubber, examples thereof including diene synthetic rubbers such as isoprene rubber (IR), butadiene rubber (BR), butyl rubber (IIR), and acrylonitrile rubber (NBR), halogenated butyl rubbers such as brominated butyl rubber (BR-IIR), and other synthetic rubbers such as polyurethane rubber, acryl rubber, fluorine-contained rubber, silicone rubber, and chlorosulfonated polyethylene.

The rubber composition for vibrationproof rubber according to the aspect of the present invention preferably contains a carbon black. The carbon black may be any carbon black used in an ordinary rubber industry, such as an SAP class (ASTM No.: N100s), ISAF class (the same No.: N200s), HAF class (the same No.: 300s), FEF class (the same No.: N500s), GPF class (the same No.: N600s) or SRF class (the same No.: 700s) carbon black. The carbon black may be any granulated carbon black, which has been granulated, considering the handleability of the carbon black in an ordinary rubbery industry; or a non-granulated carbon black. In order to optimize the hardness (static spring constant) of the vibrationproof rubber, the content of the carbon black is set to a range preferably from 30 to 100 parts, more preferably from 30 to 60 parts by mass when the total amount of the one or more rubber components is regarded as 100 parts by mass.

As far as the advantageous effects of the present invention are not damaged, any blending agent used ordinarily in the rubbery industry may be appropriately used and blended, together with the above-mentioned rubber component(s) and carbon black, into the rubber composition of the invention for vibrationproof rubber. Examples of the blending agent include a sulfur-containing vulcanizer, a vulcanization promoter, a silica, a silane coupling agent, stearic acid, a vulcanization promotion acid, a vulcanization retardant, an antiaging agent, softening agents such as a wax and an oil, and a working aid.

The rubber composition for vibrationproof rubber according to the aspect of the present invention preferably includes a sulfur-containing vulcanizer. The species of sulfur as this sulfur-containing vulcanizer is sufficient to be a sulfur species for ordinary rubbers, and may be, for example, powdery sulfur, precipitated sulfur, insoluble sulfur, or highly dispersible sulfur. The sulfur content in the rubber composition for vibrationproof rubber according to the aspect of the invention is preferably from 0.7 to 3 parts, more preferably from 0.15 to 3 parts by mass for 100 parts by mass of the rubber component(s), considering the dynamic magnification of the vibrationproof rubber to be produced.

The vulcanization promoter may be a vulcanization promoter usable ordinarily for vulcanizing rubbers. Examples thereof include sulfenamide type, thiuram type, thiazole type, thiourea type, guanidine type, and dithiocarbamic acid salt type vulcanization promoters. These may be used singly or in the form of an appropriate mixture. The blend amount, of the vulcanization promoter(s) is preferably from 1 to 5 parts, more preferably from 1 to 3 parts by mass for 100 parts by mass of the rubber component(s).

The antiaging agent may be an antiaging agent usable usually for rubbers, examples thereof including aromatic amine type, amine-ketone type, monophenolic type, bisphenolic type, polyphenolic type, dithiocarbamic acid salt type, and thiourea type antiaging agents. These may be used singly or in the form of an appropriate mixture.

The rubber composition of the aspect of the present invention for vibrationproof rubber can be yielded by using a mixing machine used in an ordinary rubber industry, such as a Banbury mixer, a kneader or a roll, to mix and knead, together with the above-mentioned rubber component(s) and carbon black, for example, one or more blending agents used ordinarily in the rubber industry, examples of the agent(s) including a sulfur-containing vulcanizer, a vulcanization promoter, a silica, a silane coupling agent, stearic acid, a vulcanization promotion aid, a vulcanization retardant, an antiaging agent, softeners such as wax and oil, and a working aid.

The method for blending the above-mentioned individual components with each other is not particularly limited, and may be, for example, any one of the following: a method of kneading, in advance, blending components other than the sulfur-containing vulcanizer, the vulcanization promoter and other vulcanization-related components to prepare a masterbatch, adding the remaining components thereto, and further kneading the resultant; a method of adding the individual components in any order to a machine as described above, and then kneading the resultant; and a method of adding all the components simultaneously to such a machine, and kneading the resultant.

The individual components are kneaded and then molded/worked, and subsequently vulcanized. In this way, a vibrationproof rubber heightened in attenuation can be produced. The vulcanizing temperature is, for example, from 120 to 200° C., preferably from 140 to 180° C.

A description will be made about the other aspect of the rubber composition for vibrationproof rubber according to the present invention. This rubber composition is a composition in which when the total amount of one or more rubber components is regarded as 100 parts by mass, an S-SBR is included in an amount of 85 to 100 parts by mass; and this S-SBR is an S-SBR in which the amount-proportion of styrene is from 20 to 45% by mass, and the amount-proportion of vinyl is from 35 to 65% by mass.

The S-SBR is generally obtained by anion-polymerizing starting monomers in a hydrocarbon, and is characterized in that both of the molecular weight distribution thereof and the amount-proportion of vinyl therein are more easily controllable than any E-SBR obtained by an emulsion polymerization method of the monomers (suspension polymerization method thereof) in water. The method for producing the S-SBR is not particularly limited as far as the method can attain the production of the S-SBR which is an S-SBR in which the amount-proportion of styrene is from 20 to 45% by mass, and the amount-proportion of vinyl is from 35 to 65% by mass. The method may be a method known by those skilled in the art. In order to heighten the finally obtained vibrationproof rubber in attenuation, the amount-proportion of styrene in the S-SBR is preferably from 20 to 45% by mass. Similarly, the amount-proportion of vinyl in the S-SBR is preferably from 50 to 65% by mass.

In the aspect of the present invention, the S-SBR is preferably a modified S-SBR. The modified S-SBR contains a functional group containing a heteroatom. This heteroatom-containing functional group may be introduced into a terminal of a polymer chain of an unmodified S-SBR, or may be introduced into the polymer chain. The functional group is preferably introduced into the terminal. Examples of the heteroatom-containing functional group include amino, alkoxyl, hydroxyl, epoxy, carboxyl and cyano groups, and halogen radicals. The modified solution-polymerized SBR may contain at least one of the functional groups given as the examples. Examples of the amino group include primary amino, secondary amino, and tertiary amino groups. Examples of the alkoxyl groups include methoxy, ethoxy, propoxy, and butoxy groups. Examples of the halogen radicals include chlorine, and bromine radicals. The functional groups given as the examples each interact with a filler, in particular, various functional groups that a carbon black has, and silanol groups (Si—OH) of silica. The word "interact" herein means following: in the case of, for example, a silica, the functional groups each react chemically with silanol groups of the silica to form chemical bonds or hydrogen bonds. The S-SBR may be an oil-extended product thereof that has a purpose of improving the carbon black or silica in fillability or workability.

In the rubber composition for vibrationproof rubber according to the aspect of the present invention, the rubber component(s) blendable other than the S-SBR is/are, for example, natural rubber (NR). The rubber composition may contain, besides natural rubber, a synthetic rubber, examples thereof including diene synthetic rubbers such as isoprene rubber (IR), butadiene rubber (BR), butyl rubber (IIR), and acrylonitrile rubber (NBR), halogenated butyl rubbers such as brominated butyl rubber (BR-IIR), and other synthetic rubbers such as polyurethane rubber, acryl rubber, fluorine-contained rubber, silicone rubber, and chlorosulfonated polyethylene.

The silica may be, for example, a silica used to reinforce an ordinary rubber, examples of the silica including wet silica, dry silica, sol-gel silica, and surface-treated silica. Wet silica is particularly preferred. These may be used singly or in the form of a mixture of two or more thereof. The blend amount of the silica in the rubber composition is preferably from 5 to 80 parts, more preferably from 30 to 60 parts by mass when the total amount of the rubber component(s) is regarded as 100 parts by mass.

In the aspect of the present invention, a silane coupling agent is preferably blended into the rubber composition to improve the silica in dispersibility in the composition. Examples of a compound used ordinarily as the silane coupling agent include bis-(3-(triethoxysilyl)propyl)tetrasulfide and other sulfide silanes; 3-mercaptopropyltrimethoxysilane, and other mercaptosilanes; 3-aminopropyltrimethoxysilane, and other amino silanes; and vinyltriethoxysilane, and other vinyl silanes. These agents may be used singly or in the form of a mixture of two or more thereof. The blend amount of the silane coupling agent(s) in the rubber composition is preferably from 2 to 10% by mass when the total blend amount of the silica is regarded as 100% by mass.

A carbon black, together with the silica, may be blended into the rubber composition for vibrationproof rubber according to the aspect of the present invention. The carbon black may be any carbon black used in an ordinary rubber industry, such as an SAF class (ASTM No.: N100s), ISAF class (the same No.: N200s), HAF class (the same No.: 300s), FEF class (the same No.: N500s), GPF class (the same No.: N600s) or SRF class (the same No.: 700s) carbon black. The carbon black may be any granulated carbon black, which has been granulated, considering the handleability of the carbon black in an ordinary rubbery industry; or a non-granulated carbon black.

As far as the advantageous effects of the present invention are not damaged, one or more blending agents used ordinarily in the rubbery industry may be appropriately used and blended, together with the above-mentioned rubber-component(s), silica and silane coupling agent, into the rubber composition of the aspect of the invention for vibrationproof rubber. Examples of the blending agent(s) include a sulfur-containing vulcanizer, a vulcanization promoter, a carbon black, stearic acid, a vulcanization promotion aid, a vulcanization retardant, an antiaging agent, softeners such as wax and oil, and a working aid.

The rubber composition for vibrationproof rubber according to the aspect of the present invention preferably includes a sulfur-containing vulcanizer. The species of sulfur as this sulfur-containing vulcanizer is sufficient to be a sulfur species for ordinary rubbers, and may be, for example, powdery sulfur, precipitated sulfur, insoluble sulfur, or highly dispersible sulfur. The sulfur content in the rubber composition for vibrationproof rubber according to the aspect of the invention is preferably from 0.7 to 3 parts, more preferably from 0.15 to 3 parts by mass for 100 parts by mass of the rubber component(s), considering the dynamic magnification of the vibrationproof rubber to foe produced.

The vulcanization promoter may be a vulcanization promoter usable ordinarily for vulcanizing rubbers. Examples thereof include sulfenamide type, thiuram type, thiazole type, thiourea type, guanidine type, and dithiocarbamic acid salt type vulcanization promoters. These may be used singly or in the form of an appropriate mixture. The blend amount of the vulcanization promoter(s) is preferably from 1 to 5 parts, more preferably from 1 to 3 parts by mass for 100 parts by mass of the rubber component(s).

The antiaging agent may be an antiaging agent usable usually for rubbers, examples thereof including aromatic amine type, amine-ketone type, monophenolic type, bisphenolic type, polyphenolic type, dithiocarbamic acid salt type, and thiourea type antiaging agents. These may be used singly or in the form of an appropriate mixture.

The rubber composition of the aspect of the present invention for vibrationproof rubber can be yielded by using a mixing machine used in an ordinary rubber industry, such as a Banbury mixer, a kneader or a roll, to mix and knead one or more blending agents used ordinarily used in the rubber industry, together with the above-mentioned rubber component(s), silica and silane coupling agent, examples of the blending agent(s) including a sulfur-containing vulcanizer, a vulcanization promoter, a carbon black, stearic acid, a vulcanization promotion aid, a vulcanization retardant, an antiaging agent, softeners such as wax and oil, and a working aid.

The method for blending the above-mentioned individual components with each other is not particularly limited, and may be, for example, any one of the following: a method of kneading, in advance, blending components other than the sulfur-containing vulcanizer, the vulcanization promoter and other vulcanization-related components to prepare a masterbatch, adding the remaining components thereto, and further kneading the resultant; a method of adding the individual components in any order to a machine as described above, and then kneading the resultant; and a method of adding all the components simultaneously to such a machine, and kneading the resultant.

The individual components are kneaded and then molded/worked, and subsequently vulcanized. In this way, a vibrationproof rubber heightened in attenuation can be produced. The vulcanizing temperature is, for example, from 120 to 200° C., preferably from 140 to 180° C.

Specific examples of an application of the vibrationproof rubber according to the present invention include various vibrationproof rubbers for automobiles, such as engine mount, strut mount, body mount, cab mount, member mount, differential mount, and other mount rubbers; suspension bush, arm bush, torque bush and other bush rubbers; and torsional dumper, muffler hanger, dumper pulley, dynamic dumper rubbers. Moreover, the vibrationproof rubber can be favorably applied not only to such automobile rubbers but also to vibrationproof rubbers for rail trains, vibrationproof rubbers for industrial machines, seismic isolation rubbers for buildings, seismic isolation rubber bearings or supports, and other vibrationproof rubbers or seismic isolation rubbers.

EXAMPLES

Hereinafter, this invention will be more specifically described by demonstrating working examples of ones of the aspects of the present invention.

(Preparation of Each Rubber Composition)

Into 100 parts by mass of one or more rubber components were blended components for each of Examples 1 to 6, and Comparative Example 1 in accordance with a blend formulation in Table 1, and then an ordinary Banbury mixer was used to knead the blended components to prepare a rubber composition. Individual blending agents described in Table 1 are as follows:

Solution-polymerized styrene butadiene rubbers (S-SBRs):
  S-SBR1: "Nipol NS612", manufactured by Zeon Corp. (modified S-SBR; styrene amount-proportion: 15% by mass, and vinyl amount-proportion: 30% by mass),
  S-SBR2: "SL563", manufactured by JSR Corp. (modified S-SBR; styrene amount-proportion: 20% by mass, and vinyl amount-proportion: 55.5% by mass), and
  S-SBR3: "TOUGHDEN E580" manufactured by Asahi Kasei Corp. (modified S-SBR; 37.5-part-by-mass-oil extended product; styrene amount-proportion: 35.5% by mass, and vinyl amount-proportion: 43% by mass);
Carbon black GPF (N660): "SEAST V", manufactured by Tokai Carbon Co., Ltd.;
Zinc oxide: "ZINC OXIDE, Species 3", manufactured by Sakai Chemical Industry Co., Ltd.;
Stearic acid: "LUNAC S-20" (manufactured by Kao Corporation);
Oil: "NC 140", manufactured by JXTG Nippon Oil fie Energy Corp.;
Antiaging agent 1: "6C", manufactured by Ouchi Shinko Chemical Industrial Co., Ltd.;
Antiaging agent 2: "RD", manufactured by a company Lanxess Japan;
Wax: "OZOACE 2701", manufactured by Nippon Seiro Co., Ltd.;
SULFUR: "5% oil-containing sulfur microparticle", manufactured by Tsurumi Chemical Industry Co., Ltd.;
Vulcanization promoter 1: "CZ", manufactured by Ouchi Shinko Chemical Industrial Co., Ltd.; and
Vulcanization promoter 2: "TS", manufactured by Ouchi Shinko Chemical Industrial Co., Ltd.

Examples 1 to 6, and Comparative Example 1

In each of the examples, in accordance with a blend formulation (unit: part(s) by mass) shown in Table 1 described below, a Banbury mixer was used to add/mix initially components other than any sulfur, any vulcanization promoter and any vulcanization retardant to/with each other (component-discharged temperature: 120° C. at the mixing time) at a first mixing stage, and next add/mix a sulfur and vulcanization promoters to/with the resultant mixture at a final mixing stage to prepare a rubber composition for vibrationproof rubber. About each of the rubber compositions, a vulcanized rubber was prepared therefrom, and properties thereof were evaluated.

The resultant vulcanized rubber was evaluated in accordance with the following evaluating methods:
[Attenuation]
About a sample of the vulcanized rubber, which had the shape of a column (diameter: 50 mm, and height: 25 mm) and was yielded by using a predetermined mold and vulcanizing the rubber composition at 170° C. for 12 minutes, vibrations were applied thereto at a frequency of 15 Hz and an amplitude of ±2%, and then the tan δ of the sample was measured. About the evaluation thereof, the value of that in Comparative Example 1 was regarded as 100 to make an index evaluation. It is meant that as the resultant numerical value is larger, the vulcanized rubber is higher in attenuation to be better.
[Dynamic Magnification]
(Static Spring Constant (Ks))
A sample having a columnar shape (50 mm in diameter× 25 mm) of the vulcanized rubber was produced by vulcanizing each of the rubber compositions at 170° C. for 12 minutes, and simultaneously pressing/shaping the composition. The produced test piece was compressed by 5 mm two times into the columnar axis direction. Thereafter, when a strain thereof was being restored, from the resultant load-deflect ion curve thereof the deflection load of the test piece at 1.25 mm and that at 3.75 mm were measured. From these values, the static spring constant (Ks) (N/mm) was calculated out.
(Dynamic Spring Constant (Kd))
The test piece used when the static spring constant (Ks) was measured was compressed by 2.5 mm into the columnar axis direction. From below the piece, a constant-displacement compressive harmonic vibration having an amplitude of 0.05 mm was applied at a frequency of 100 Hz to the piece around the position of the piece where the piece had been compressed by 2.5 mm, this position being the center of the vibration. Using the upper load cell, the dynamic load was detected, and then in accordance with JIS-K 6394, the dynamic spring constant (Kd) (N/mm) of the piece was calculated out.
(Dynamic Magnification: Kd/Ks Ratio)
The dynamic magnification of the test piece was calculated out in accordance with the following expression:

"Dynamic magnification"="Dynamic spring constant (Kd)"/"Static spring constant (Ks)"

The results are shown in Table 1.

TABLE 1

|  | Comparative Example 1 | Example 1 | Example 2 | Example 3 | Example 4 | Example 5 | Example 6 |
|---|---|---|---|---|---|---|---|
| (Blend) | | | | | | | |
| NR | 100 | | 15 | | 15 | | 15 |
| S-SBR1 | | 100 | 85 | | | | |
| S-SBR2 | | | | 100 | 85 | | |
| S-SBR 3 (37.5-part-by-mass-oil-extended product) | | | | | | 137.5 | 116.9 |
| Carbon black | 50 | 50 | 50 | 50 | 50 | 50 | 50 |
| Zinc oxide | 5 | 5 | 5 | 5 | 5 | 5 | 5 |
| Stearic acid | 1 | 1 | 1 | 1 | 1 | 1 | 1 |
| Oil | 5 | 5 | 5 | 5 | 5 | 5 | 5 |
| Antiaging agent 1 | 1.5 | 1.5 | 1.5 | 1.5 | 1.5 | 1.5 | 1.5 |
| Antiaging agent 2 | 1 | 1 | 1 | 1 | 1 | 1 | 1 |

TABLE 1-continued

|  | Comparative Example 1 | Example 1 | Example 2 | Example 3 | Example 4 | Example 5 | Example 6 |
| --- | --- | --- | --- | --- | --- | --- | --- |
| Wax | 2 | 2 | 2 | 2 | 2 | 2 | 2 |
| Sulfur | 2.5 | 2.5 | 2.5 | 2.5 | 2.5 | 2.5 | 2.5 |
| Vulcanization promoter 1 | 1 | 1 | 1 | 1 | 1 | 1 | 1 |
| Vulcanization promoter 2 | 0.2 | 0.2 | 0.2 | 0.2 | 0.2 | 0.2 | 0.2 |
| (Evaluations) | | | | | | | |
| Dynamic magnification index | 100 | 80 | 106 | 86 | 124 | 86 | 126 |
| Attenuation index | 100 | 117 | 110 | 275 | 226 | 241 | 204 |

The results are as shown in Table 1. It is understood that Examples 1 to 6 became higher in vulcanized rubber attenuation than Comparative Example 1, which was a control. It is understood that, in particular, Examples 1, 3 and 5, which each contained the S-SBR in an amount of 90 parts or more by mass, attained the compatibility of a raise of the vibrationproof rubber in attenuation with a lowering of the rubber in dynamic magnification at a high level.

Hereinafter, this invention will be more specifically described by demonstrating working examples of the others of the aspects of the present invention.

(Preparation of Each Rubber Composition)

Into 100 parts by mass of one or more rubber components were blended components for each of Examples 7 to 12, and Comparative Examples 2 to 4 in accordance with a blend formulation in one of Tables 2 and 3, and then an ordinary Banbury mixer was used to knead the blended components to prepare a rubber composition. Individual blending agents described in Tables 2 and 3 are as follows:

Solution-polymerized styrene butadiene rubbers (S-SBRs)

S-SBR1: "SL563", manufactured by JSR Corp. (modified S-SBR; styrene amount-proportion: 20% by mass, and vinyl amount-proportion: 55.5% by mass), and S-SBR2: "TOUGHDEN E580" manufactured by Asahi Kasei Corp. (modified S-SBR; 37.5-part-by-mass-oil-extended product; styrene amount-proportion: 35.5% by mass, and vinyl amount-proportion: 43% by mass);

Silica: "Nipsil RS150", manufactured by Tosoh Silica Corp.;
Silane coupling agent: "Si69", manufactured by a company Evonik Japan;
Carbon black GPF (N660): "SEAST V", manufactured by Tokai Carbon Co., Ltd.;
Zinc oxide: "ZINC OXIDE, Species 3", manufactured by Sakai Chemical Industry Co., Ltd.;
Stearic acid: "LUNAC S-20" (manufactured by Kao Corporation);
Oil: "NC 140", manufactured by JXTG Nippon Oil & Energy Corp.;
Antiaging agent 1: "6C", manufactured by Ouchi Shinko Chemical Industrial Co., Ltd.;
Antiaging agent 2: "RD", manufactured by a company Lanxess Japan;
Wax: "OZOACE 2701", manufactured by Nippon Seiro Co., Ltd.;
SULFUR: "5% oil-containing sulfur microparticle", manufactured by Tsurumi Chemical Industry Co., Ltd.;
Vulcanization promoter 1: "CZ", manufactured by Ouchi Shinko Chemical Industrial Co., Ltd.; and
Vulcanization promoter 2: "TS", manufactured by Ouchi Shinko Chemical Industrial Co., Ltd.

Examples 7 to 12, and Comparative Examples 2 to 4

In each of the examples, in accordance with a blend formulation (unit: part(s) by mass) shown in one of Tables 2 and 3 described below, a Banbury mixer was used to add/mix initially components other than any sulfur, any vulcanization promoter and any vulcanization retardant to/with each other (component-discharged temperature: 140 to 150° C. at the mixing time) at a first mixing stage, and next add/mix a sulfur and vulcanization promoters to/with the resultant mixture at a final mixing stage to prepare a rubber composition for vibrationproof rubber. About each of the rubber compositions, a vulcanized rubber was prepared therefrom, and properties thereof were evaluated.

The resultant vulcanized rubber was evaluated in accordance with the following evaluating methods:

[Attenuation]

About a sample of the vulcanized rubber, which had the shape of a column (diameter: 50 mm, and height: 25 mm) and was yielded by using a predetermined mold and vulcanizing the rubber composition at 170° C. for 12 minutes, vibrations were applied thereto at a frequency of 15 Hz and an amplitude of ±2%, and then the tan δ of the sample was measured. About the evaluation thereof, the value of that in Comparative Example 1 was regarded as 100 to make an index evaluation. It is meant that as the resultant numerical value is larger, the vulcanized rubber is higher in attenuation to be better.

[Dynamic Magnification]

(Static Spring Constant (Ks))

A sample having a columnar shape (50 mm in diameter× 25 mm) of the vulcanized rubber was produced by vulcanizing each of the rubber compositions at 170° C. for 12 minutes, and simultaneously pressing/shaping the composition. The produced test piece was compressed by 5 mm two times into the columnar axis direction. Thereafter, when a strain thereof was being restored, from the resultant load-deflection curve thereof the deflection load of the test piece at 1.25 mm and that at 3.75 mm were measured. From these values, the static spring constant (Ks) (N/ram) was calculated out.

(Dynamic Spring Constant (Kd))

The test piece used when the static spring constant (Ks) was measured was compressed by 2.5 mm into the columnar axis direction. From below the piece, a constant-displacement compressive harmonic vibration having an amplitude of 0.05 mm was applied at a frequency of 100 Hz to the piece around the position of the piece where the piece had been compressed by 2.5 mm, this position being the center of the vibration. Using the upper load cell, the dynamic load was detected, and then in accordance with JIS-K 6394, the dynamic spring constant (Kd) (N/mm) of the piece was calculated out.

(Dynamic Magnification: Kd/Ks Ratio)

The dynamic magnification of the test piece was calculated out in accordance with the following expression:

"Dynamic magnification"="Dynamic spring constant (Kd)"/"Static spring constant (Ks)"

The results are shown in Tables 2 and 3.

TABLE 2

|  | Comparative Example 2 | Example 7 | Example 8 | Example 9 | Example 10 |
|---|---|---|---|---|---|
| (Blend) | | | | | |
| NR | 100 | | | | 15 |
| S-SBR1 | | 100 | 100 | 100 | 85 |
| Carbon black | 50 | | | | |
| Silica | | 30 | 50 | 60 | 50 |
| Silane coupling agent | | 4 | 4 | 4 | 4 |
| Zinc oxide | 5 | 5 | 5 | 5 | 5 |
| Stearic acid | 1 | 1 | 1 | 1 | 1 |
| Oil | 5 | 5 | 5 | 5 | 5 |
| Antiaging agent 1 | 1.5 | 1.5 | 1.5 | 1.5 | 1.5 |
| Antiaging agent 2 | 1 | 1 | 1 | 1 | 1 |
| Wax | 2 | 2 | 2 | 2 | 2 |
| Sulfur | 2.5 | 2.5 | 2.5 | 2.5 | 2.5 |
| Vulcanization promoter 1 | 1 | 1 | 1 | 1 | 1 |
| Vulcanization promoter 2 | 0.2 | 0.2 | 0.2 | 0.2 | 0.2 |
| (Evaluations) | | | | | |
| Dynamic magnification index | 100 | 113 | 121 | 128 | 110 |
| Attenuation index | 100 | 225 | 239 | 242 | 201 |

The results are as shown in Table 2. It is understood that Examples 7 to 10 became higher in vulcanized rubber attenuation than Comparative Example 2, which was a control.

TABLE 3

|  | Comparative Example 3 | Comparative Example 4 | Example 11 | Example 12 |
|---|---|---|---|---|
| (Blend) | | | | |
| NR | 100 | 15 | | 15 |
| S-SBR2 (37.5-part-by-mass-oil-extended product) | | 116.9 | 137.5 | 116.9 |
| Carbon black | 50 | 50 | | |
| Silica | | | 50 | 50 |
| Silane coupling agent | | | 4 | 4 |
| Zinc oxide | 5 | 5 | 5 | 5 |
| Stearic acid | 1 | 1 | 1 | 1 |
| Oil | 5 | | | |
| Antiaging agent 1 | 1.5 | 1.5 | 1.5 | 1.5 |
| Antiaging agent 2 | 1 | 1 | 1 | 1 |
| Wax | 2 | 2 | 2 | 2 |
| Sulfur | 2.5 | 2.5 | 2.5 | 2.5 |
| Vulcanization promoter 1 | 1 | 1 | 1 | 1 |
| Vulcanization promoter 2 | 0.2 | 0.2 | 0.2 | 0.2 |
| (Evaluations) | | | | |
| Dynamic magnification index | 100 | 126 | 114 | 108 |
| Attenuation index | 100 | 204 | 193 | 172 |

The results are as shown in Table 3. It is understood that differently from Comparative Example 3, which was a control, Comparative Example 4, into which not any silica but the carbon black was blended, was raised in attenuation, but was considerably deteriorated in dynamic magnification. By contrast, as compared with Comparative Example 3, into which the carbon black was blended. Examples 11 and 12 was restrained from being deteriorated in dynamic magnification while these working examples were raised in attenuation.

What is claimed is:

1. A vibrationproof rubber obtained by vulcanizing and shaping a rubber composition for vibrationproof rubber, the rubber composition for vibrationproof rubber, wherein when a total amount of one or more rubber components is regarded as 100 parts by mass, a solution-polymerized styrene butadiene rubber is comprised in an amount of 85 to 100 parts by mass; and the solution-polymerized styrene butadiene rubber is a rubber in which an amount-proportion of styrene is from 10 to 45% by mass, and an amount-proportion of vinyl is from 30 to 65% by mass, and wherein the solution-polymerized styrene butadiene rubber is a modified solution-polymerized styrene butadiene rubber, the modified S-SBR contains a functional group containing a heteroatom wherein the heteroatom-containing functional group includes amino, alkoxyl, hydroxyl, epoxy, carboxyl and cyano groups, and halogen radicals.

2. A vibrationproof rubber obtained by vulcanizing and shaping a rubber composition for vibrationproof rubber the rubber composition for vibrationproof rubber, wherein when a total amount of one or more rubber components is regarded as 100 parts by mass, a solution-polymerized styrene butadiene rubber is comprised in an amount of 85 to 100 parts by mass, and a silica is comprised in an amount of 30 to 60 parts by mass; and the solution-polymerized styrene butadiene rubber is a rubber in which an amount-proportion of styrene is from 20 to 45% by mass, and an amount-proportion of vinyl is from 35 to 65% by mass, and wherein the solution-polymerized styrene butadiene rubber is a modified solution-polymerized styrene butadiene rubber, the modified S-SBR contains a functional group containing a heteroatom wherein the heteroatom-containing functional group includes amino, alkoxyl, hydroxyl, epoxy, carboxyl and cyano groups, and halogen radicals.

3. The rubber composition for vibrationproof rubber according to claim 1, wherein the solution-polymerized styrene butadiene rubber is comprised in an amount of 90 to 100 parts by mass when the total amount of the one or more rubber components is regarded as 100 parts by mass.

4. The rubber composition for vibrationproof rubber according to claim 1, wherein a carbon black is comprised in an amount of 30 to 100 parts by mass when the total amount of the one or more rubber components is regarded as 100 parts by mass.

5. The rubber composition for vibrationproof rubber according to claim 2, wherein a content of styrene in the solution-polymerized styrene butadiene rubber is from 30 to 45% by mass.

* * * * *